July 22, 1969 J. F. EMERSON 3,456,513
ACCELERATION VERIFICATION CONTROL SYSTEM
Filed April 3, 1967 3 Sheets-Sheet 1

INVENTOR.
JOHN F. EMERSON
BY *George B. Aujeroth*
ATTORNEY

INVENTOR.
JOHN F. EMERSON
BY
ATTORNEY

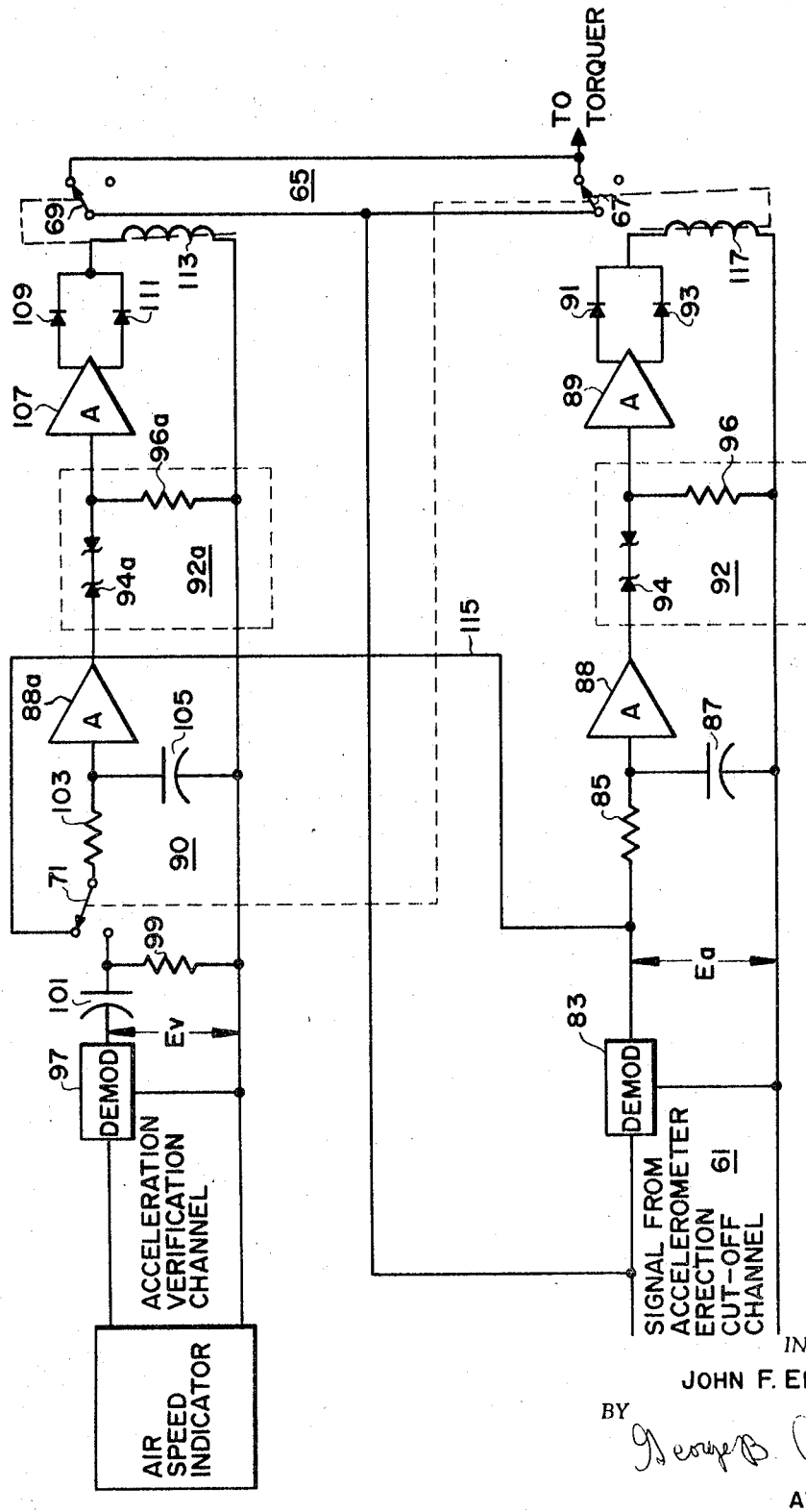

3,456,513
ACCELERATION VERIFICATION CONTROL SYSTEM
John F. Emerson, Hackensack, N.J., assignor to Singer-General Precision, Inc., a corporation of Delaware
Filed Apr. 3, 1967, Ser. No. 627,986
Int. Cl. G01c 19/30; G01p 9/04; B64c 17/06
U.S. Cl. 74—5.47                                                                4 Claims

ABSTRACT OF THE DISCLOSURE

In an aircraft having a stable platform as part of the navigation system, it is customary to have the platform system operate in an erection cut-off mode when acceleration sensed by accelerometers exceeds a predetermined threshold. This invention relates to an arrangement for verifying that the information provided by the accelerometers to cut-off erection is due to acceleration of the aircraft and not due to the accelerometers sensing gravity because of platform tilt. If the input sensed becomes mainly gravity, and the true aircraft acceleration falls below the established threshold, the erection cut-off is by-passed and platform erection is restored.

BACKGROUND OF THE INVENTION

Field of the invention

The present invention relates to a verification arrangement for a stable platform system while operating in the erection cut-off mode, and more particularly to an arrangement for by-passing the cut-off under certain conditions.

Description of the prior art

As part of the navigation system of many present day aircraft, a stable platform is used. The stable platform frequently has four gimbals to provide unlimited maneuverability, system stability, and the lowest drift rate obtainable from the inertial sensors. The platform outputs include aircraft heading and vertical attitude. The heading output is usually magnetic compass slaved or directional gyro. Except for the improvement in heading output which comes from improved magnetic compass slaving cut-off and improved verticality of the azimuth axis of the stable platform, the present invention is not concerned with the heading output so its operation will not be described.

The manner of erection of the stable element and the maintaining of it erected to the local vertical under normal flight conditions are well known in the art, so that a description of the platform and the details herein will be limited only to those features which are necessary for an understanding of the present inventive concept.

It is well known that accelerometers used in the stable element of a stable platform are sensitive to both gravity and aircraft acceleration. Since the system is arranged to rotate each accelerometer so that, in the absence of aircraft acceleration, its input axis will be perpendicular to gravity, unless some additional control is included, the system will rotate the stable element towards alignment with the vector sum of the acceleration and gravity. The stable element is gyro stabilized so the rate of alignment would be low but for sustained acceleration the departure from true vertical could be excessive. Various methods have been used to prevent erection to apparent vertical including erection cut-off. Subject to certain limitations, the accelerometer signal also can be used for erection cut-off. This has been done by including in the control circuitry a filter to prevent erection cut-off due to normal oscillatory accelerations and a threshold to prevent erection cut-off due to sustained signals below some preselected value. This is effective because aircraft maneuvers such as climbing, diving and turning produce relatively high values of acceleration. If during erection cut-off, the stable element should depart from vertical sufficiently to cause accelerometer output from gravity alone to exceed the threshold value, erection cut-off would continue, preventing the proper operation of the erection circuits.

SUMMARY OF THE INVENTION

The acceleration vertification control circuit contemplated herein has an air/speed channel which includes sensing means to distinguish a steady state condition from a changing condition which would result from aircraft acceleration, and a by-pass circuit responsive to the sensing means which will by-pass the erection cut-off and restore the erection to the platform under a steady state condition, notwithstanding the fact that the accelerometer is providing a cut-off signal in response to sensing a gravity component.

The objects and advantages of the invention will be more readily understood by those skilled in the art after a detailed consideration of the following specification taken with the accompanying drawings.

BRIEF DESCRIPTION OF THE DRAWINGS

FIGURE 5 is a functional schematic and block diagram of the interrelationship between the erection cut-off circuit and the acceleration vertification circuit described herein.

DESCRIPTION OF THE PREFERRED EMBODIMENT

Figure 1:
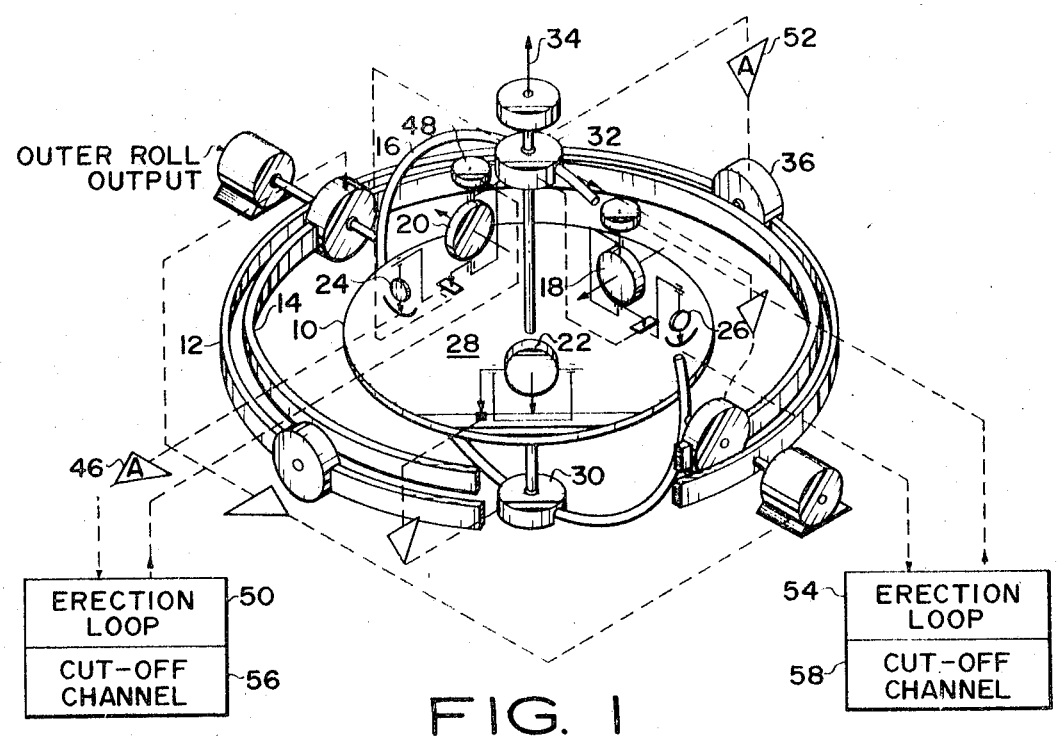
FIGURE 1 is a perspective and partly schematic view of a stable platform.

A typical stable element used in an aircraft is a three-gyro, four-gimbal stable platform 10, mounted within a vibration isolator. The platform includes an outer roll gimbal 12, a pitch gimbal 14 and a redundant inner-roll gimbal 16 which gives the stable element all attitude capability. The stable element 28 consists of three rate integrating gyros 18, 20, 22 for the X, Y and Z axes, and two accelerometers 24 and 26 mounted upon a structure which is supported by the three servo-driven gimbal rings mounted within a housing.

Also mounted on the azimuth axis of the stable element is a resolver 32 which transforms the vertical gyro pick-off signals from the signals from the X–Y co-ordinates of the stable element to roll and pitch co-ordinates of the platform. In addition, there is a resolver used for resolving Coriolis correction to the X and Y accelerometer outputs (the outputs of accelerometers 24, 26) and a synchro transmitter 34, to give heading output from the azimuth axis.

When installed in the aircraft, the axis of rotation of the pitch gimbal is parallel to the aircraft pitch axis. The pitch gimbal is driven by a servo motor driving through a gear reduction and serves as a pitch gimbal torquer 36.

The outer-most gimbal is the outer-roll gimbal 12 which is supported by the fixed gimbal or outer case. The outer-roll gimbal axis is perpendicular to the pitch gimbal axis and is in the plane of the inner-roll gimbal axis. Its freedom of movement is 360 degrees.

The two accelerometers 24, 26 on the stable element are mounted with their input axes 90° apart (orthogonal). A two-axis accelerometer could be used instead of two single-axis ones. Any accelerometer suitable for the applicable environment can be used, but it should be heavily damped and have a substantially linear range of at least ±0.5 g for the high performance fighter type aircraft which especially needs accelerated verification control.

Figure 2:
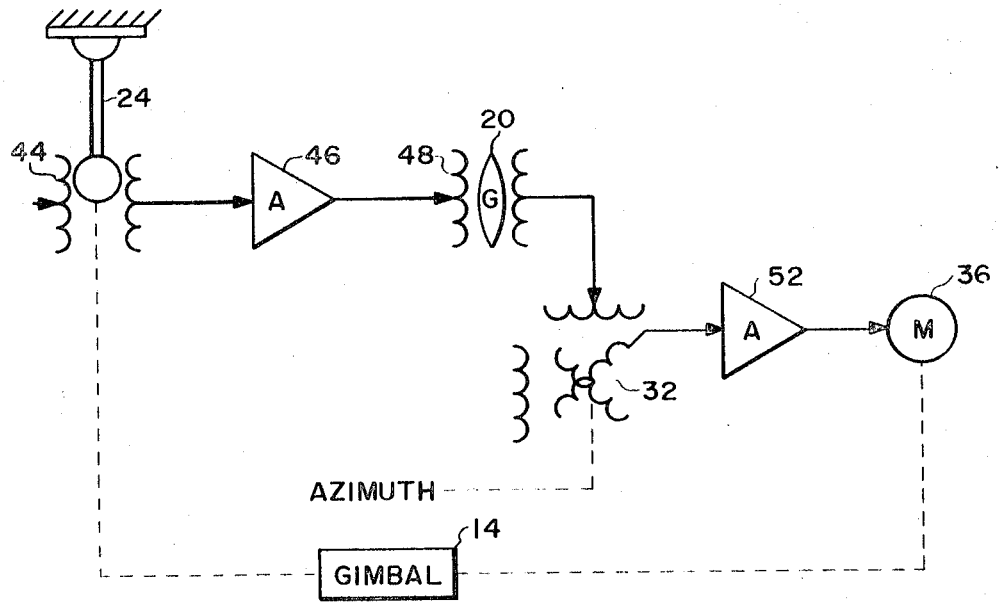
FIGURE 2 shows schematically an accelerometer erection loop during normal flight operation.

Upon the initial application of power, the stable element may have any attitude. If it has some attitude other than parallel to the surface of the earth, i.e., the azimuth axis vertical, the accelerometer, e.g., accelerometer 24 (see FIG. 2) will give an electrical output due to the gravity input. This voltage is amplified by amplifier 46 and applied to the gyro torquer 48 of Y gyro 20 in the erection loop 50. Torquing the gyro makes it start to precess; as the gyro just starts to precess, an electrical signal is generated at the gyro pickoff. This signal is transformed through the azimuth resolver 32 which determines the proportion of roll or pitch component and applies it to the correct gimbal servo, i.e., a signal from the resolver is amplified in the amplifier 52 and fed to a servo motor torquer, e.g., 36 which drives the appropriate gimbal. The gimbal e.g., pitch gimbal 14, moves around its axis in a direction to align the accelerometer so that the voltage from the accelerometer pickoff goes to zero. When the accelerometer output goes to zero, the gyro is no longer torqued, the output of the gyro goes to zero, and the gimbal servo stops driving.

Thus, during normal, steady-state flight conditions with only oscillatory accelerations, gravity will be sensed by the accelerometer due to tilt of the stable element which in turn will start a train of action tending to restore the accelerometer to a null condition.

If, however, the acceleration sensed exceeds a predetermined threshold for sufficient length of time, the closed-loop operation of the system is cut-off and the system operates in an open-loop condition until the steady-state velocity conditions return, at which time, the loop is again closed and the operating conditions just described are again restored. If the vertical erection loops were not cut-off during sustained accelerations, the platform would erect to a false vertical due to the output from the accelerometer.

Figure 3:
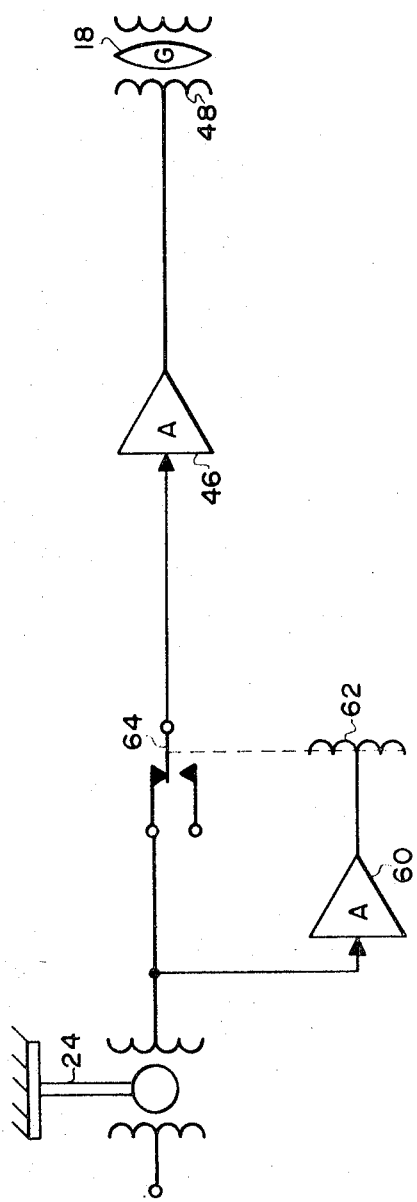
FIGURE 3 depicts schematically a portion of one of the erection channels with erection cut-off circuit.

As shown in FIGURE 1, there are two erection loops 50 and 54, corresponding to the X and Y accelerometers 24 and 26. Each loop has a cut-off control circuit 56, 58. Cut-off of the two loops is independent of one another. One of these loops is shown in FIGURE 3. This happens to be the Y loop from accelerometer 24, but the X loop is identical. Signals from accelerometer 24 will be filtered in the cut-off amplifier 60. When the output becomes equivalent to .280 $g$-seconds for .070 $g$ input, i.e., the predetermined threshold, relay 62 will be energized which opens switch 64 to the gyro torquer amplifier 46. Due to the transmission of the filter and the threshold, oscillatory and very low sustained accelerations will not activate the cut-off relay. The threshold for sustained acceleration is roughly equivalent to .035 $g$'s. The relation between time and acceleration for cut-off is given approximately as $$.035 \ g = a(1 - E^{-t/T})$$

$a$ in $g$'s, $t$ in seconds, $T = 5.77$ sec.

Figure 4:
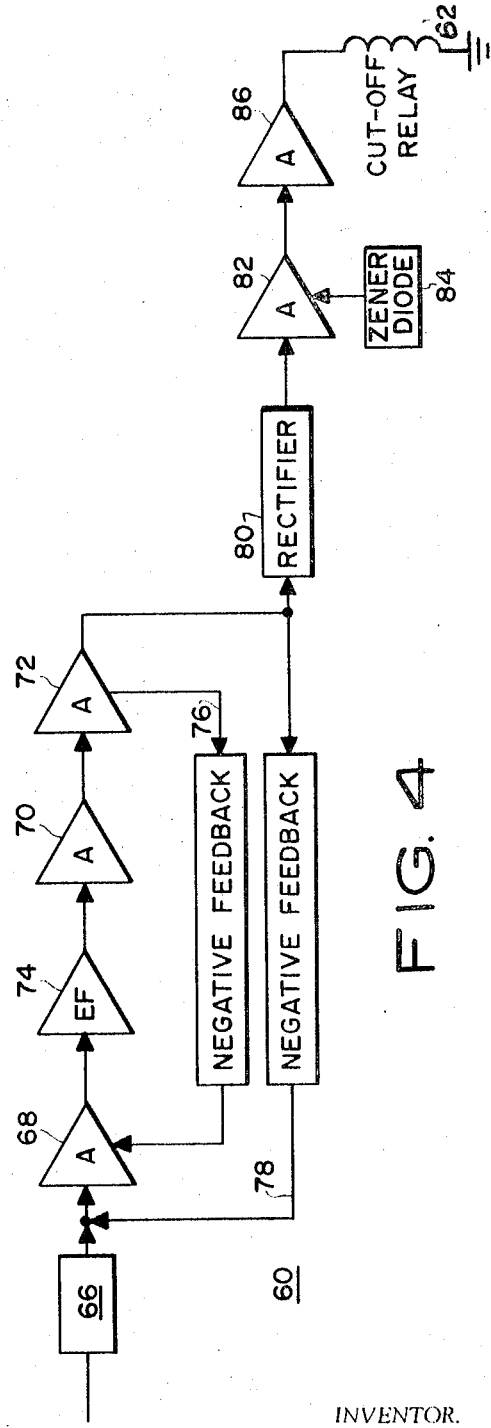
FIGURE 4 is a functional block diagram of an erection cut-off circuit.

In one version of erection cut-off amplifier 60, shown in FIGURE 4, the signal is demodulated, filtered, and modulated again by a chopper and R-C network 66. This signal is then amplified four times, using three conventional amplifiers 68, 70, 72 and an emitter follower 74. Also included are two negative feedback networks 76 and 78 for linearity, temperature stability, and power supply fluctuations. After amplification, the signal is rectified in rectifier 80. The signal is again amplified in amplifier 82.

If this D.C. voltage is of sufficient magnitude to overcome the Zener bias, of Zener diode 84, the amplifier 82 is triggered into conduction driving the output stage 86. The output stage 86 then actuates relay 62.

When starting the system, the erection cut-off circuits are by-passed and the erection rate is increased for about 180 seconds to allow time for the stable element to erect. In the system just described, earth's rate plus aircraft speed corrections are made and the gyro drift rates are low. The corrections are not precise because, among other things, earth's rate is resolved about magnetic heading instead of true heading and speed is taken as air-speed from the air data computer but they usually are adequate to maintain the platform erect during periods of accelerated flight when the erection cut-off circuit disconnects the accelerometer signal from the gyro torquer amplifier 46. However, in about 10% of the flights, the stable element becomes titled so that gravity as well as aircraft acceleration is sensed in an amount sufficient to keep the erection cut-off circuit in the cut-off condition. An explanation of how the large tilt angle can occur has been difficult to arrive at. Nevertheless, such tilt does occur, and must, therefore, be taken into account for the system to function properly. In the present invention, to verify whether the acceleration sensed is truly aircraft acceleration, velocity signals derived from air-speed are used to verify aircraft acceleration during periods of erection cut-off. An RC rate circuit is used to remove the steady-state velocity component after demodulation. The changing velocity component passed by the rate circuit will be filtered and used to continue the erection cut-off when the pseudo-acceleration signal is greater than 17 milli-$g$'s (an acceleration of 20 kt. per minute). For smaller acceleration, the acceleration verification circuit by-passes the erection cut-off to re-erect the platform to the accelerometer.

The acceleration verification circuit 90 together with its associated erection cut-off channel 61 is shown in FIGURE 5. The cut-off channel 61 operates from the accelerometer signal. The acceleration verification channel operates from the component of airspeed which is along the same direction as the input axis of its accelerometer. Airspeed is measured along the aircraft longitudinal axis and is transformed to the X, Y axes of the stable element by a resolver. The resolver angle is made equal to the platform heading angle, usually by means of a repeater servo receiving input from the azimuth synchro transmitter 34 of FIGURE 1.

The function of erection cut-off channel 61 of FIGURE 5 is as already described. Since FIGURE 5 is a simplified functional diagram, the operation will be described in terms of its components. The signal from the accelerometer is demodulated by demodulator 83 and fed into an RC filter circuit having a resistor 85 and capacitor 87. This circuit in turn provides an output across the threshold circuit 92 to D-C amplifier 89 having diodes 91, 93 connected to the double ended output of the amplifier 89. These diodes 91, 93 in turn drive a relay 117 which controls two pole gang switch 65. This switch 65 has first and second switch elements 67 and 71; the function of these elements will be made clear shortly.

In the acceleration verification channel 90 of FIGURE 5, the component of airspeed is fed to a demodulator 97. The output from the demodulator is fed to an RC rate circuit having a resistor 99 and a capacitor 101. Omitting for the moment switch element 71, there is then an RC filter circuit with resistor 103 and capacitor 105. This RC circuit, in turn, is coupled to a D-C amplifier 107 with a double ended output through diodes 109, 111. This output then controls relay 113 acting on switch element 69.

Switch element 67, responsive to relay 93 of the erection cut-off circuit 61 is ganged together with switch element 71 of the acceleration verification circuit. Switch element 71 selects either the demodulated accelerometer signal through line 115 from the erection cut-off circuit 61 or the pseudo-acceleration signal derived from airspeed by RC rate circuit 99, 101.

While relay 117 has not been actuated by channel 61 to cut-off erection, switch element 71 connects RC filter 103, 105 of acceleration verification channel 90 to the output of demodulator 83 of channel 61. Thus the filtered signal to amplifier 107 will be the same as that to amplifier 89. Erection cut-off by-pass switch 69 may be open if the filtered accelerometer signal is greater than .017 g but this would not cause erection cut-off because switches 67 and 69 would not both be open. When relay 117 opens switch 67, switch 69 will already be open because the threshold of acceleration verification channel 90 is less than the threshold for erection cut-off channel 61. Opening switch 67 will also switch 71, transferring control of erection cut-off by-pass switch 69 to the pseudo-acceleration signal which is derived from the airspeed by RC rate circuit 99, 101. If the signal derived from the airspeed is not greater than the threshold for channel 90, relay 113 will release thereby closing switch 69 and the accelerometer signal will be applied to the gyro torquer amplifier.

When erection cut-off is by-passed the stable element will erect to reduce the output of the accelerometer until relay 117 is released, returning the system to its normal operating condition.

In other words, for the erection cut-off circuit, the accelerometer signal is demodulated and filtered by RC circuit 85, 87 and then amplified in amplifier 88. The threshold is obtained by network 92 composed of back-to-back Zener diodes 94 and a load resistor 96. Signals larger than the deadband are amplified in double ended output amplifier 89 and applied to relay 117 through the appropriate diode. The airspeed component from the resolver is demodulated and applied to RC circuit 99, 101 whose output is the pseudo-acceleration signal derived from airspeed. In the absence of erection cut-off, the relay 71 is in its normal position so that the input to RC filter 103, 105 is the accelerometer signal. The operation of that portion of the acceleration verification channel following the contacts of relay 71 is the same as for the corresponding circuit in the erection cut-off channel except that the gain of the threshold amplifier 88a is twice the gain of amplifier 88. Thus, the threshold for relay 113 of the acceleration verification channel is one-half that for the erection cut-off channel relay 117. In the presence of sufficient acceleration, erection will be cut off. If the pseudo-acceleration signal is above the acceleration verification channel threshold, relay 113 will remain actuated so that erection will continue to be cut off. If the pseudo-acceleration signal is less than the acceleration verification channel threshold, after a time delay, relay 113 will drop out which will cause the restoring of erection. In the continued absence of a pseudo-acceleration signal, relay 113 will remain closed, causing the platform to erect to the accelerometer signal. When the signal is reduced to the dropout threshold of the erection cut-off channel, the erection cut-off channel will switch to normal.

Exact values of thresholds or rate circuit and filter circuit time constants or ratios among them are not critical for satisfactory operation.

Values in one system are as follows:

The erection cut-off threshold is .035 g.

The erection cut-off filter time constant, T, is 5.77 seconds.

The relation between time, $t$, and acceleration, $a$, for cut-off is $$a(1-E^{-t/T})=.035 \; g$$

The acceleration verification threshold is .017 g.

The acceleration verification rate circuit time constant, $T_v$, is 1.5 seconds.

The acceleration verification filter time constant, $T_F$, is 4.7 seconds.

Referring to FIGURE 5, the following values can be used when the input impedances of amplifier 88 and 88a are very high and the output impedances of the demodulators are very low:

| | | |
|---|---|---|
| Resistor 85 | megohms | .577 |
| Capacitor 87 | mfd | 10 |
| Resistor 103 | megohms | .47 |
| Capacitor 105 | mfd | 10 |
| Resistor 99 | megohms | .15 |
| Capacitor 101 | mfd | 10 |

For proper scaling of velocity, $v$, to acceleration, $a$:
$$E_a = k_a a$$
$$E_v = k_v v$$
$$k_a/k_v = T_v$$
the time constant of the acceleration verification channel rate circuit.

The transmission of the acceleration verification channel circuit with the filter circuit connected to the rate circuit is given on page 362 of Principles of Automatic Controls, Floyd E. Nixon, published by Prentice Hall, as:

$$\frac{E_0}{E_1} = K \frac{S}{(1+T_1 S)(1+T_2 S)}$$

$$= \frac{T_v S}{1+(T_v+T_F+RC)S+T_v T_F S^2}$$

(where R is resistor 99 and C is capacitor 101)

It is to be observed, therefore, that the present invention contemplates an improvement in a stable platform used in an aircraft which has an air/speed indicator or sensing means, and that said improvement is associated with the cut-off channel of the erection loop between one platform accelerometer and the respective gyro assembly. Particularly, the improvement consists in having an acceleration verification channel associated with the cut-off channel to distinguish the aircraft acceleration from the earth's gravity component by using information supplied by the air/speed sensing means. This acceleration verification channel will include coupling means to the air/speed sensing means, a rate circuit receiving said air/speed sensing means signal; a filter circuit disposed for coupling to the rate circuit; relay means responsive to the filter circuit, a first switch element acted on by said relay means which in the closed position will by-pass the cut-off means and restore the erection loop; threshold sensing means in this channel set at a lower threshold than in the cut-off channel; and, a second switch element ganged with the cut-off means of the cut-off channel for coupling the rate circuit to the filter circuit when the cut-off means has opened the erection loop, and coupling the cut-off channel to both filter circuits when the cut-off means has not opened up the erection loop, so that the signal is the same in both channels, but, if the accelerometer signal exceeds the low threshold of the acceleration verification channel, the first switch element will open. This will not cause erection cut-off because the opening of the first switch element does not open up the loop, the cut-off means acting to open the loop only if a signal higher than the threshold of the cut-off channel is exceeded, but said higher signal opening up both the first switch element and the cut-off means and at the same time transferring the second switch element to the rate circuit. If the signal derived from the air/speed sensing means is not greater than said lesser threshold for the acceleration varification channel, the relay means will release the first switch element, closing the by-pass so that the accelerometer signal passes to the gyro assembly. The platform is shown in FIGURE 1 and the erection loops and cut-off channels, 50–56; 54–58 are shown there in block diagram. The cut-off channels 56 and 58 provide the signals to the circuit shown in FIGURE 5 which will, in the cut-off mode, cut the erection loop, and, in the acceleration verification mode provided for by acceleration verification channel 90, restore the erection even in the presence of a pseudo-acceleration signal caused by gravity alone.

While the present invention has been described in a preferred embodiment, it will be obvious to those skilled in the art that various modifications can be made therein within the scope of the invention, and it is intended that the appended claims cover all such modifications.

What is claimed is:

1. In a stable platform used in an aircraft having an air/speed sensing means, said stable platform including at least one gyro assembly, one accelerometer, an erection loop between said accelerometer and said gyro assembly and a cut-off channel in said loop, said cut-off channel including first threshold sensing means and cut-off means responsive to said sensing means to open up said erection loop if a predetermined acceleration threshold is exceeded, the improvement therein of having an acceleration verification channel associated with said cut-off channel to distinguish the aircraft acceleration from the earth's gravity component by using information supplied by the air/speed sensing means, said acceleration verification channel comprising in combination, coupling means to the air/speed sensing means;

a rate circuit to which is fed the output from said air/speed sensing means;

a filter circuit disposed for coupling to the rate circuit;

relay means responsive to said filter circuit;

a first switch element acted on by said relay means which in the closed position will by-pass said cut-off means and restore the erection loop;

second threshold sensing means controlling the action of said first switch element wherein the threshold of said second threshold sensing means is less than that of said first threshold sensing means; and, a second switch element ganged with said cut-off means for coupling said rate circuit to said filter circuit when said cut-off means has opened up said erection loop, and coupling said cut-off channel to said filter circuit when said cut-off means has not opened up said erection loop; whereby, while the cut-off means has not opened up said erection loop, the second switch element connects the filter circuit to the cut-off channel so that the signal is the same in both channels, but if the accelerometer signal exceeds the threshold of said second threshold sensing means the first switch element will open, but this will not cause erection cut-off, because the cut-off means will not open up said loop, said cut-off means acting to cut-off the loop only if the higher threshold of said first threshold sensing means is exceeded, said higher threshold likewise opening said first switch element, but transferring control of the cut-off by-pass second switch element to the rate circuit and if the signal derived from the air/speed sensing means is not greater than said lesser threshold for said second threshold sensing means, said relay means will release said first switch element closing the by-pass so that the accelerometer signal passes to said gyro assembly.

2. In an improvement in a stable platform as claimed in claim 1, said acceleration verification channel including a demondulator to which is fed an A–C signal from said air/speed sensing means, said rate circuit being an RC resistor capacitor circuit.

3. In an improvement in a stable platform as claimed in claim 2, said filter circuit being an RC resistor capacitor circuit.

4. In an improvement in a stable platform as claimed in claim 3, said filter circuit output being fed to an amplifier, the output of which is fed to a Zener diode resistor circuit acting as second threshold sensing means.

References Cited

UNITED STATES PATENTS

| 3,077,553 | 2/1963 | Borghard et al. | 74—5.4 |
| 3,276,269 | 10/1966 | Whitehead | 74—5.41 |

ROBERT A. O'LEARY, Primary Examiner

WILLIAM E. WAYNER, Assistant Examiner

U.S. Cl. X.R.

33—226; 73—504; 74—5.34; 244—79